United States Patent [19]

Fawley

[11] Patent Number: 4,676,276
[45] Date of Patent: * Jun. 30, 1987

[54] METHOD OF TREATING A PIPE AND PRODUCT PRODUCED THEREBY

[76] Inventor: Norman C. Fawley, 255 Rafael Walk, Long Beach, Calif. 90803

[*] Notice: The portion of the term of this patent subsequent to Dec. 24, 2002 has been disclaimed.

[21] Appl. No.: 827,176

[22] Filed: Feb. 6, 1986

Related U.S. Application Data

[63] Continuation of Ser. No. 589,567, Feb. 14, 1984, abandoned, which is a continuation-in-part of Ser. No. 312,958, Oct. 20, 1981, abandoned.

[51] Int. Cl.⁴ .......................... F16L 9/04; B65H 81/00
[52] U.S. Cl. ..................................... 138/172; 138/174; 156/172
[58] Field of Search ............... 156/172, 171, 195, 185, 156/188; 138/172, 174, 178, 139, DIG.2, 144, 131, 153, 156, 128; 285/286; 428/36, 377

[56] References Cited

U.S. PATENT DOCUMENTS

| | | | |
|---|---|---|---|
| 2,026,133 | 12/1935 | Mapes | 29/148.2 |
| 2,161,036 | 6/1939 | Gremmel | |
| 2,280,501 | 4/1942 | Stephenson | 220/3 |
| 2,713,551 | 7/1955 | Kennedy | |
| 3,096,105 | 7/1963 | Risley | 285/286 |
| 3,349,807 | 10/1967 | Penman | 128/172 |
| 3,439,405 | 4/1969 | Berman et al. | 29/407 |
| 3,457,963 | 7/1969 | Hardwick | 138/172 |
| 3,483,896 | 12/1969 | Grosh | 138/153 |
| 3,698,746 | 10/1972 | Loncaric | 285/286 |
| 3,815,773 | 6/1974 | Duvall et al. | 220/3 |
| 3,843,010 | 10/1974 | Morse et al. | 220/3 |
| 3,870,350 | 3/1975 | Loncaric | 285/286 |
| 3,939,874 | 2/1976 | Gray | 138/153 |
| 3,969,812 | 7/1976 | Beck | 29/421 R |
| 3,977,614 | 8/1976 | Hardwick | 242/2 |
| 4,148,127 | 4/1979 | Somerville | 138/172 |
| 4,176,691 | 12/1979 | Jude et al. | 138/103 |
| 4,195,669 | 4/1980 | Ives et al. | 138/172 |
| 4,224,966 | 9/1980 | Somerville | 138/172 |
| 4,514,245 | 4/1985 | Chabrier | 156/161 |

FOREIGN PATENT DOCUMENTS

| | | |
|---|---|---|
| 1441653 | 5/1966 | France. |
| 52-38630 | 3/1977 | Japan. |
| 55-39444 | 11/1980 | Japan. |
| 1013039 | 12/1965 | United Kingdom. |
| 1025319 | 4/1966 | United Kingdom. |

OTHER PUBLICATIONS

Beardmove et al., Science, vol. 208, May 23, 1980, "Fiber-Reinforced Composites: Engineered Structural Materials".

"Fracture Resistance of Wire Wrapped Cylinders" Shoemaker et al Journal of Engineering for Industry, Feb. '73, p. 219.

Primary Examiner—Michael Ball
Attorney, Agent, or Firm—Marvin A. Naigur; John E. Wilson; John P. Shannon

[57] ABSTRACT

A reinforced pipe including a pipe made of a metal which is subject to ductile fracture propagation and a reinforcing wrapping extending around and in contact with the pipe for preventing the ductile fracture propagation. The reinforcing wrapping comprises a plurality of lightweight, continuous, unidirectional, high strength, non-corrodible, electrically nonconductive fibers extending helically around the pipe under a limited tension which is less than the tension which would cause the fibers to break during wrapping, the fibers being encapsulated in a curable viscous matrix to define a continuous composite material.

14 Claims, 7 Drawing Figures

METHOD OF TREATING A PIPE AND PRODUCT PRODUCED THEREBY

This application is a continuation, of application Ser. No. 589,567, filed Mar. 14, 1984, now abandoned, which is a continuation-in-part of Ser. No. 312,958, filed Oct. 20, 1981, now abandoned.

BACKGROUND OF THE INVENTION

Pipes, and pipelines formed thereby, are playing increasingly important roles in the transportation of gas, oil, water and other fluids. Since the products which pipelines convey are so valuable and since the failure of such pipelines carrying fluids under pressures of about a hundred to well over a thousand psi can be so disastrous, for the past several decades, pipes have been treated in many ways to improve their serviceability. For example, pipelines installed underground have been coated or wrapped with various materials, such as bituminous materials, fiberglass mat, plastic tape and the like for protection from electrolytic and biochemical corrosion, cyclical soil stress, cathodic disbonding and mechanical damage. However, relatively little attention has been directed to improvements in terms of burst strength, fracture prevention, durability, heat-resistance, safety factor and weight, and the few attempts at the latter improvements have resulted in additional problems. For example, relatively large diameter wire has been wrapped around a pipe for increasing the radial, or hoop, strength of the pipe. However, arrangements of this type have been susceptible to crevice corrosion caused by the accumulation of moisture and dirt in the spaces between adjacent strands of the wire, and between the wire and the pipe. In addition, the wire has substantially increased the weight of the pipe, making pipes reinforced with the wire more expensive to ship and more difficult to handle.

SUMMARY OF THE INVENTION

It is therefore an object of the present invention to provide an improved pipe which enjoys the protection of the prior art types, yet is dramatically improved from a ductile fracture resistance standpoint.

It is a further object of the present invention to provide an improved pipe of the above type in which increased strength and ductile fracture resistance characteristics are imparted to the pipe with a minimum of added labor and materials, and without causing any additional problems, such as the aforementioned crevice corrosion.

It is still a further object of the present invention to provide a method of manufacturing an improved pipe of the above type.

The reinforced pipe according to the present invention includes a pipe made of a metal which is subject to ductile fracture propagation in a predetermined direction, such as along the longitudinal axis of the pipe, and a reinforcing wrapping extending around and in contact with the pipe which prevents such ductile fracture propagation. The wrapping has all the strength of steel at only a fraction of the weight of steel, thus, leaving the pipe employing the wrapping easy to handle. The wrapping is non-corrodible by the atmosphere, the soil, and most chemicals and it protects the pipe from corrosion by the same elements. The wrapping is electrically non-conductive so that it does not cause galvanic corrosion of the pipe it wraps, and it does not disturb cathodic corrosion protection, which is often provided in a pipeline. The wrapping also protects the pipe from galvanic corrosion by, for example, damp earth and from external impacts, which are a common cause of initiating a propagating ductile fracture. The wrapping is inexpensive enough to make it not only economically feasible but commercially desirable.

The wrapping includes continuous unidirectional high tensile strength fibers encapsulated in a curable viscous matrix. The fibers are wrapped around the pipe under a limited tension which is less than a wrapping tension which would cause the fibers to break. This wrapping under limited tension not only avoids breaking fibers during wrapping, but it also prevents resin starvation, that is, insufficient matrix for the fibers, which results in the cracking and separation of the composite material defined by the fibers and the matrix. The limited tension is also less than a wrapping tension which would cause any perceptible prestress in the pipe.

BRIEF DESCRIPTION OF THE DRAWINGS

The above brief description, as well as further objects, features and advantages of the present invention will be more fully appreciated by reference to the following detailed description of a presently preferred but nonetheless illustrative embodiment in accordance with the present invention when taken in conjunction with the accompanying drawings, wherein.

DESCRIPTION OF THE PREFERRED EMBODIMENT

By way of example, the method of the present invention will be described in connection with a steel or other metallic pipe of a relatively large diameter, suitable for a pipeline, which is treated to provide protection against electrolytic and biochemical corrosion, cathodic disbonding, soil stress, and mechanical damage, to dramatically increase its strength in the circumferential direction and to increase its ductile fracture resistance in the axial direction.

According to a preferred embodiment of the present method, the metallic pipe is preferably cleaned by either sand or grit blasting or by mechanical scraping and wire brushing to render the pipe surface free from oil, grease, dust, moisture and non-adhering mill scale. A primer can then be applied to the outer surface of the pipe to provide a bonding agent between the steel pipe and a viscous substance to be applied subsequently. The primer can be of any known substance, such as AWWA type B, which is preferred since it has a greatly increased bond factor yet enjoys a fast drying time and is completely compatible with both asphalt and coal tar coatings.

Figure 1:
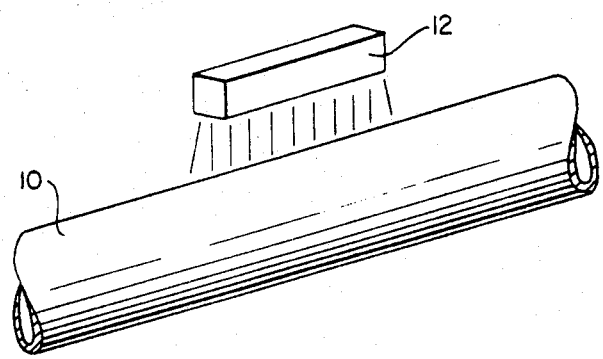
FIGS. 1, 2 and 3 are perspective views of a pipe section being treated according to the method of the present invention.

According to one embodiment of the invention, after the pipe has been primed according to the foregoing, a hot viscous material, such as coal tar enamel or an asphalt enamel, is applied to the primed outer surface of the pipe. More particularly, as can be seen from FIG. 1 of the drawings, which shows a section of a pipe 10 being treated according to the method of the present invention, the hot enamel is applied to the surface of the pipe 10 by a discharge head shown, in general, by the reference numeral 12. The head 12 is spaced from the pipe 10 and is adapted to discharge the enamel onto the outer surface of the pipe. The head 12 can be of a conventional design and is preferably in the form of a weir, a floodbox, a flood coater or a curtain coater, which receives the enamel at an elevated temperature, preferably approximately 500° F., and discharges it onto the outer surface of the pipe 10. In this coating step, the pipe 10 may be moved longitudinally and rotated relative to the head 12, or a machine can be provided which traverses the fixed length of pipe and includes a head, such as the head 12, for discharging the enamel onto the outer surface of the pipe. The aforementioned coal tar enamel is preferably made from coke oven pitch which is modified and filled, while the asphalt enamel can be produced from selected petroleum crudes that are oxidized and filled, both in a conventional manner.

Figure 2:
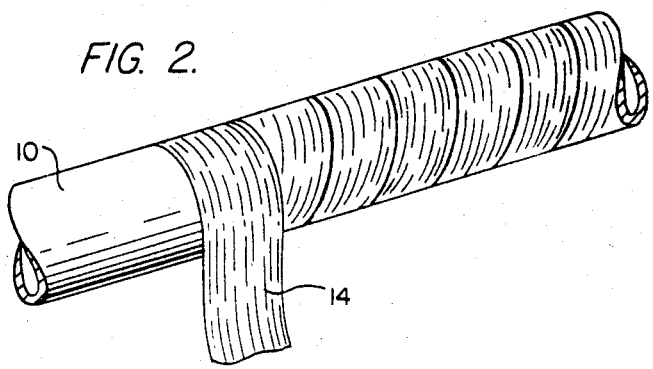

While the coating of enamel viscous material is still hot, i.e., before it completely dries or bonds, a layer, such as a web, of a plurality of lightweight continuous unidirectional high-strength inorganic non-corrodible electrically non-conductive fibers are wrapped around the pipe 10. More particularly, as is illustrated in FIG. 2, a continuous strip or wrapping 14 of the continuous, unidirectional high-strength fibers is applied to the treated outer surface of the pipe 10 by winding the web around the pipe as shown. The wrapping 14 is wound on the pipe in one or more layers as needed with a limited tension, to be described in more detail hereinafter, which insures that the web adequately adheres to the pipe. Additional viscous material is applied to the fibers as they are wrapped around the pipe 10. Other viscous materials may be used, some of which do not involve application at high temperatures.

As an alternative, the pipe 10 may be coated with the viscous material and then wrapped with fibers which are pre-impregnated with a viscous material which is dried prior to the wrapping process. Where the viscous material coating is hot, as with the coal tar enamel or asphalt enamel, the heat of the coating causes the dried viscous material to flow, thereby forming with the fibers a continuous mass of composite material. Where the viscous material coating is not hot, heat from another source must be used to cause the pre-impregnated viscous material to flow. The viscous material pre-impregnating the fibers can be the same as or different from the viscous material coating the pipe 10. The fibers forming the web are preferably in the form of glass, or other materials having properties equivalent to glass, in a configuration to be described in detail later.

Figure 3:
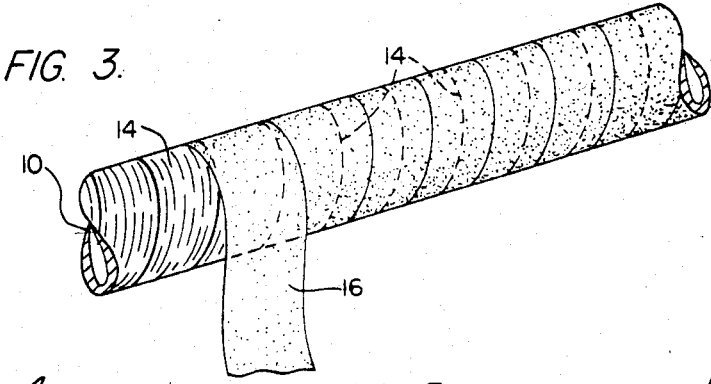

After the wrapping 14 of unidirectional fibers has been applied to the pipe, an outer wrap of protective material is applied to the pipe. In FIG. 3, a wrapping of the protective material is shown by the reference numeral 16, and is wound around the pipe (which has been previously covered by the wrapping 14 of unidirectional fibers) as shown. The outer wrapping 16 may be of any material that will provide additional protection against mechanical damage during transportation and, when applicable, burial of the line, as well as protection for the enamel and fibers against cyclical soil stress and damage by stones or rocks. One material for the outer wrapping 16 would be coal tar or asphalt-impregnated, reinforced fiber tissue or coal tar or asphalt-saturated, reinforced asbestos felt. Where the outer wrapping 16 is applied while the previously applied viscous material is still in a hot or unbonded state, it is bonded to the unidirectional fibers and the pipe when the viscous material hardens upon bonding. The fibers and the bonded enamel form a homogeneous matrix which is bonded to the pipe and imparts increased strength to the pipe and prevents corrosion, as will be described in detail.

It is understood that the wrapping 14 can be wound in a manner so that the unidirectional fibers extend in a plane substantially perpendicular to the axis of the pipe, with the degree of overlap between each section and its adjoining section varying from 1% to approximately 50%. The wrapping 16 can be wound in the same manner with the same range of overlap. As in the case of the application of the viscous substance, the wrappings 14 and 16 can be applied by a stationary roller, a payoff head, or the like while the pipe 10 is moved longitudinally and rotated; or, alternatively, the pipe could remain stationary and a machine or machines equipped with payoff heads for applying the wrappings 14 and 16 would traverse and rotate about the pipe. Since these techniques are well known in the art, they will not be described in any further detail.

Figure 4:
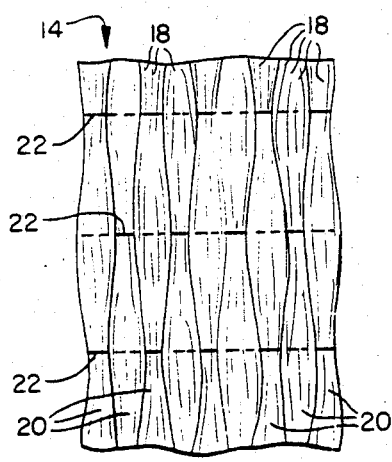
FIGS. 4, 5 and 6 are partial, enlarged, perspective views of configurations of unidirectional, high-strength fibers that can be used in the method of the present invention.

A section of the wrapping 14 is shown in more specific detail in FIG. 4. More particularly, the individual, continuous, unidirectional fibers forming the wrapping 14 are shown by the reference numeral 18 and are separated into a plurality of rovings, or bundles, 20 by a transversely extending string (or strings) 22 which extends through the bundles in an alternating "over-under" pattern as shown, to provide the separation. The section contains many thousands, perhaps hundreds of thousands, of fibers.

Figure 5:
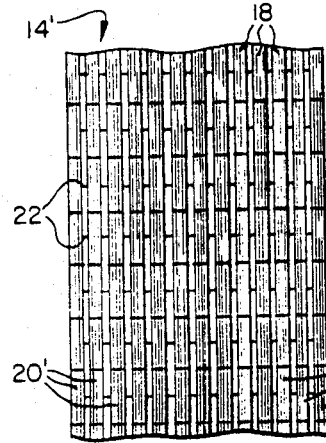

A wrapping according to an alternative embodiment is depicted in FIG. 5. In this embodiment, the unidirectional fibers 18 are separated into a plurality of bundles 20' which extend for a smaller width than those of the embodiment of FIG. 4, with the string 22 extending through the bundles as shown. Although not clear from the drawings, it is understood that the string 22 can be braided, or otherwise tied, in a manner to hold the bundles 20' in place.

Figure 6:
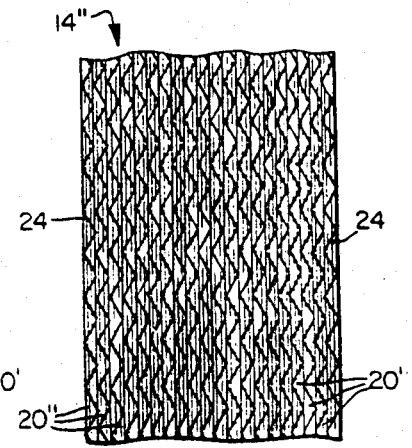

According to the embodiment of FIG. 6, a wrapping 14" is formed by a plurality of bundles 20" each of which is formed by a plurality of unidirectional fibers 18 that are stitched in a "Z" pattern by a thread 24 extending through the entire length of each bundle.

According to still another embodiment, the use of a string or the like is eliminated and the fibers 18 could be applied to the pipe in bundles by a mechanical winder or the like.

According to yet another embodiment of the present invention, the unidirectional fibers can be adhered to the pipe 10 by eliminating the step of coating the pipe with viscous material and, instead, by applying an adhesive to the fibers before they are wrapped onto the pipe. This can be done by forming the wrapping 14 of fibers by any of the techniques disclosed above, pre-impregnating the wrapping 14 with the viscous material and allowing it to dry, and then applying an adhesive substance of any conventional type to either surface of the wrapping 14. In addition, a backing material, of any conventional type, could be applied to one adhesive-coated surface of the wrapping 14 and the other adhesive-coated surface would be wrapped around the pipe in a manner similar to that depicted in FIG. 2. Alternatively, an adhesive coating could be applied to one surface of the wrapping 14, a backing applied to said adhesive-coated surface and another adhesive coating applied to the other surface of the backing material which then is applied to the pipe 10 in the manner discussed above.

According to a still further embodiment of the present invention, the fibers can be impregnated by a curable viscous liquid substance or material, such as an epoxy, coal tar enamel, urethane, isophthalic polyester resin, or other similar type material, immediately before they are wrapped around the pipe, instead of allowing the viscous material to dry prior to wrapping. According to this embodiment, the coating of the pipe 10 is omitted and the fibers are passed through a bath or over a coating roller or the like to impregnate them with the curable viscous material. The fibers thus coated are immediately wrapped around the pipe as shown in FIG. 2 while the viscous material is still wet. In this state, the viscous material adheres to the pipe, which makes it easy to begin winding the fibers around the pipe.

The viscous material also holds the wrapping in place on the pipe until the viscous material dries and cures. Alternatively, the viscous material can be applied to the fibers in the foregoing manner and then allowed to dry for a predetermined time until it is in a "tacky" state before the coated fibers are wrapped around the pipe in the foregoing manner. Of course, the viscous material also adheres to the pipe in the "tacky" state. When the viscous material is cured, it forms a bond with the pipe. When the embodiments employing wet or tacky viscous material are employed, the need for a separate adhesive is eliminated.

As a result of the foregoing, the ductile fracture resistance of the pipe in its axial direction is improved considerably. Further, a portion of the stress in the circumferential direction of the pipe 10, i.e., the hoop stress, is taken up by the wrapping 14 of continuous unidirectional fibers. Thus, the circumferential strength imparted to the pipe by the unidirectional fibers can be controlled in a manner so that it is equal to the burst strength of the pipe in the longitudinal direction. This, of course, can be regulated by the type, number and size of fibers used, and the thickness of the wrapping they comprise.

In each of the foregoing embodiments, the diameter of each fiber forming the wrapping 14 is preferably less than 0.001 inch. This relatively small diameter insures that each individual fiber will be completely coated so that, when it is wrapped around the pipe 10, a homogeneous mixture is formed with no voids between the respective fibers or between the fibers and the pipe itself. Thus, a pipe wrapped according to the present invention should be free of any of the crevice corrosion referred to above. Furthermore, where the fibers are glass fibers, winding fibers less than 0.001 inch in diameter avoids breakage of the fibers. Glass does not bend much before breaking, and wrapping fibers around a pipe requires the fibers to bend. However, it has been found that fibers having diameters less than 0.001 inch can be wound around a pipe without breaking.

Figure 7:
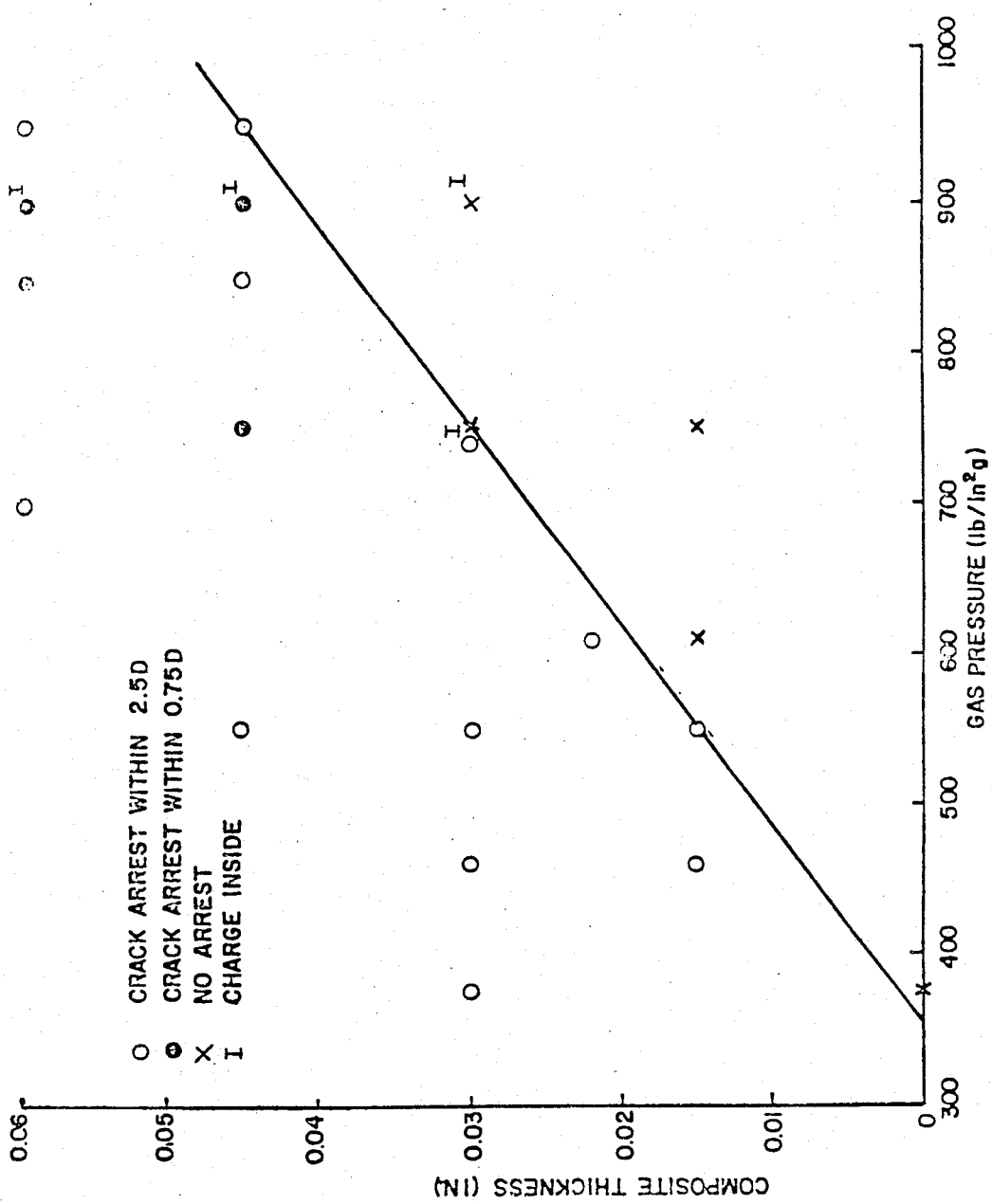
FIG. 7 is a graphic representation of the performance during testing of a reinforced pipe according to the present invention.

The following test is an example of the performance of the reinforced pipe according to the present invention. Carbon steel cylindrical pipe specimens having a 6-inch diameter were used to test the shear fracture prevention capability of the composite reinforcement. The results indicated that, although an explosively initiated shear fracture on a nitrogen-pressurized specimen without reinforcement produced a crack initiation and propagation along the total length, the shear fracture at even higher pressures for a continuously reinforced specimen either did not initiate or was arrested after a very brief propagation. The test results plotted in FIG. 7 show the shear fracture prevention/arrest capability of the reinforced pipe for various pressures. The thickness of the composite material comprising the glass fibers and viscous material wrapped around the pipe specimens is plotted against the pressure of the nitrogen in the specimens. A very clear trend is observable, and the test results can be classified into two groups. The first group, shown by solid circles, represents conditions under which the shear fracture was completely prevented from propagating in the longitudinal direction. Although cracks were present in these conditions, they were all less than 0.75 diameters of the specimen in length, a length which can be attributed to the explosive initiation, without any propagation. The other group, shown by hollow circles, represents conditions under which the shear fracture propagation did initiate but was arrested within a distance of 2.5 diameters of the pipe. Those points plotted in FIG. 7 which are marked "I" indicate that the explosive charge initiating the crack was placed inside the pipe in that test. In all of the other tests, the explosive charge was placed on the outside of the pipe. The outside charges closely approximate many pipe failures, since crack initiation is often caused by an external force, such as impact from machinery. After the initiation of the crack, the crack tends to be propagated by the internal pressure of the fluid carried by the pipe. Using these data for extrapolation to larger diameters and higher pressures, an approximately 0.5 inch thickness of composite material will be needed for a 48 inch diameter pipe transmitting gas at 1260 psig to completely prevent a shear fracture from propagating. In fact, the required thickness would be lower since the test results do not take into consideration the pipe toughness, which will be a contributing factor for the larger size pipe. If advantage is taken of the toughness of the full-size buried pipe, the test results suggest that a 0.25 to 0.30 inch thick wrapping will ensure arrest of an initiated shear fracture in a very short distance (2 to 4 diameters). This estimate for required reinforcement thickness assumes that a larger-than-critical-length through-wall flow is present in the pipe. As discussed before, the probability of getting a larger-than-critical-length through-wall flow is greatly reduced by the reinforcement itself.

The pipe treated according to the methods of the present invention enjoys several other advantages. For example, its burst pressure and its safety factor related to a specific working pressure are increased. Also, the stress value in the metal pipe would be reduced at the same service pressure, thereby significantly reducing its susceptibility to stress corrosion cracking. Of course, the metal content, and therefore the weight, of the pipe can be reduced for a given design service pressure and a given safety factor relative to burst pressure. Also, with a sufficient amount of unidirectional fiber on the pipe, a "leak-before-burst" mode of failure is achieved whereby the pipe 10 would leak, rather than burst, when subjected to sufficient internal or external corrosion. Even with a small amount of fiber on the pipe, a propagating ductile crack would be decelerated and arrested within a relatively short distance from its point of origin. These increased fracture resistance characteristics are especially important for pipes transmitting high pressure gasses, such as $CO_2$, or volatile liquids.

Among the fibers which could be used in connection with the present invention, "E" type fiberglass is preferred, although other fibers such as "S" type fiberglass and Kevlar can be used. The fibers are non-corrodible, so they are durable in all kinds of environments. They are electrically non-conductive, so they do not cause galvanic corrosion of the pipe they wrap and they insulate the pipe from materials, such as damp earth, which would cause galvanic corrosion. The fibers are lightweight yet high-strength, so that they constrain the pipe with the same force as steel while weighing on the order of one-fourth as much as the steel required to do the same job. The fibers are preferably inexpensive, some fibers, such as "E" type fiberglass, currently costing less than $1 per pound.

The encapsulation of the fibers in a curable viscous material results in a wrapping defining a continuous, fluid impervious mass of a composite material comprising the windings of fibers in a matrix of the viscous material. Such a structure prevents moisture and dirt from seeping or working their way into the wrapping between adjacent fibers. The continuity and high tensile strength of the fibers helps provide the band with the strength it needs to stop a propagating ductile fracture. The fact that the fibers are non-corrodible and encapsulated in a resin matrix to define a fluid impervious mass avoids the ingress into the windings of corrosion-causing moisture and dirt and the problems associated with the corrosion and weakening of the windings and pipe. The light weight of the fibers allows the pipes treated with the wrapping to be transported and handled easily. Furthermore, these nonmetallic fibers retain their strength over a wide range of temperatures.

The viscous material also forms a bond with the pipe, thereby preventing dirt and moisture from collecting between the wrapping and the pipe. The viscous material is preferably curable to form on the exterior of the pipe a solid resilient layer which is deformable to absorb the energy of impacts and, thus, protect the pipe from mechanical damage. The fibers are wrapped with a limited tension, that is, just enough tension to assure that the coated fibers stay straight and parallel during wrapping and lie down in order on the pipe. This limited tension varies depending on factors such as the number of fibers being wound at one time, the particular viscous material being used and the diameter of the pipe. The limited tension is below the tension which would cause the fibers to break during the wrapping process and it eliminates the need for the type of machines or processes which would be needed to wrap the fibers under significant tension. The limited tension is also below a wrapping tension which would cause any perceptible prestress in the pipe. Wrapping under limited tension also allows the wrapping to be resin-rich, the fibers comprising 67%-75% of the wrapping and the viscous material comprising the rest. Wrapping under significant tension squeezes the viscous material out from between adjacent fibers and results in resin starvation. When the viscous material shrinks upon curing, the fibers under tension pull away from the viscous material, leaving circumferential cracks and separations into which corrosion-causing moisture and dirt can seep, the cracks and separations extending all the way down to the pipe.

One of the main advantages of the method of the present invention is that it can be easily adapted to current prior art production techniques for providing a corrosion protection to the pipe, since according to these techniques, a fiberglass mat of randomly disposed (as opposed to unidirectional) glass fibers, which has negligible strength characteristics, is provided in conjunction with a hot adhesive substance and an outer protective wrap. Another advantage of the method of the present invention is that the damage potential of the pipe from any external impact will be greatly reduced. Many external impacts which may cause bare pipe to rupture will only cause local denting or gouging in the present pipe. Other impacts which may dent or gouge the bare pipe will not cause any noticeable damage to the present pipe.

It is understood that variations in the method of the present invention can be made without departing from the scope of the invention. For example, in addition to providing multiple layers of the wrapping 14 of unidirectional fibers 18, multiple layers of the outer wrapping 16 can also be applied in an alternating or unalternating sequence with the wrapping 14. It is also understood that the viscous substance referred to in the first embodiment discussed above is not necessarily limited to the enamels just described, but can be in the form of other viscous materials, such as urethane, epoxy resin, paint, or isophthalic polyester resin, which will completely coat the filaments and prevent the ingress of moisture or other potentially corrosive solutions. These substances can cure or harden by time, heating, cooling, chemical reaction, moisture, ultraviolet light or the like and thereby bond the filaments to one another and to the pipe.

It is also understood that the technique of the present method can be applied to any size (diameter) and type of pipe having characteristics equivalent to metals such as stainless steel, aluminum, copper, or brass to provide the improved characteristics set forth above, yet retain the individual qualities of these pipes (such as high corrosion resistance in the case of copper).

The method of the present invention is especially adaptable to pipes that work in a harsh environment since it dramatically increases the fracture resistance capability and therefore the service life of the pipes. For example, the need for pipe repair or replacement is reduced drastically, if not eliminated, due to a much higher strength and fracture resistance capability of the pipe. Further, it is understood that the technique of the method of the present invention can be applied to high stress points along the pipe, such as joint or longitudinal welds, to effect the advantages delineated above.

Other modifications, changes and substitutions in the foregoing disclosure are intended, and in some instances some features of the invention will be employed without a corresponding use of other features. Accordingly, it is appropriate that the appended claims be construed broadly and in a manner consistent with the spirit and scope of the invention therein.

I claim:

1. In a pipe made of a metal which is subject to ductile fracture propagation in a predetermined direction as a result of carrying fluid under pressure, the pipe having means for preventing said ductile fracture propagation, and said preventing means including a reinforcing wrapping on the pipe, the improvement comprising:

said reinforcing wrapping extending substantially the entire length of the pipe and including a plurality of continuous, high strength nonmetallic fibers wrapped helically around the pipe under a limited tension which is less than a wrapping tension which would cause a prestress in the pipe, said fibers being parallel to one another, said fibers weighing less than half as much as a ductile fracture propagation preventing means made of steel and having an equal ductile fracture propagation preventing capability, said fibers being non-corrodible to protect the pipe from the atmosphere, soil and chemicals, and said fibers being electrically non-conductive to protect the pipe from gallvanic and cathodic corrosion; and said reinforcing wrapping further including a curable viscous matrix encapsulating said fibers to define a continuous composite material, said curable viscous matrix being deformable to absorb the energy of impacts.

2. The pipe of claim 1, further comprising adhesive holding said fibers to the pipe.

3. The pipe of claim 1 wherein said fibers are glass fibers.

4. The pipe of claim 3 wherein each of said fibers has a diameter less than 0.001 inch.

5. The pipe of claim 3 wherein said glass fibers are made of E type fiberglass.

6. The pipe of claim 1, further comprising means for bonding the wrapping to the pipe.

7. The pipe of claim 6 wherein said bonding means is the curable viscous matrix.

8. In a method of increasing the ductile fracture propagation resistance of a pipe made of a metal which is subject to ductile fracture propagation as a result of carrying fluid under pressure by helically wrapping the pipe with a high tensile strength material, the improvement comprising:

encapsulating a plurality of continuous, high strength nonmetallic fibers in a curable viscous material, and wrapping said fibers substantially along the entire length of the pipe under a limited tension which is less than a tension which would cause a prestress in the pipe to a thickness sufficient to define a means for preventing the ductile fracture propagation, wherein said fibers weigh less than half as much as a ductile fracture propagation preventing means made of steel and having an equal ductile fracture propagation preventing capability, said fibers are non-corrodible to protect the pipe from the atmosphere, soil and chemicals, said fibers are electrically non-conductive to protect the pipe from galvanic and cathodic corrosion, and said curable viscous material is deformable to absorb the energy of impacts.

9. The method of claim 8, further comprising, prior to the step of wrapping:

coating the pipe with a hot viscous material.

10. The method of claim 9, wherein the step of encapsulating comprises:

pre-impregnating said fibers with additional viscous material and drying the additional viscous material prior to the step of wrapping, wherein the wrapping is performed while said hot viscous material is hot.

11. The method of claim 9, further comprising:

winding a wrapping of protective material around the pipe over said fibers.

12. The method of claim 8, further comprising:

curing said viscous material.

13. The method of claim 8, wherein the step of encapsulating includes:

pre-impregnating said fibers with viscous material, and drying said viscous material to form a web of said fibers impregnated with said viscous material, and the method further comprises applying an adhesive to one surface of said web, wherein the step of wrapping is performed by placing in contact with the pipe the surface of said web having the adhesive.

14. In a pipeline carrying fluid under pressure including pipe made of a metal which is subject to ductile fracture propagation in a predetermined direction as a result of carrying said fluid under pressure, the pipe having means for preventing said ductile fracture propagation, and said preventing means including a reinforcing wrapping on the pipe, the improvement comprising:

said reinforcing wrapping extending substantially the entire length of the pipe and including a plurality of continuous, high strength nonmetallic fibers wrapped helically around the pipe under a limited tension which is less than a wrapping tension which would cause a prestress in the pipe, said fibers being parallel to one another, said fibers weighing less than half as much as a ductile fracture propagation preventing means made of steel and having an equal ductile fracture propagation preventing capability, said fibers being non-corrodible to protect the pipe from the atmosphere, soil and chemicals, and said fibers being electrically non-conductive to protect the pipe from galvanic and cathodic corrosion; and said reinforcing wrapping further including a curable viscous matrix encapsulating said fibers to define a continuous composite material, said curable viscous matrix being deformable to absorb the energy of impacts.

* * * * *